United States Patent
Nakamura

[11] 3,848,972
[45] Nov. 19, 1974

[54] LARGE-APERTURE TELEPHOTO LENS
[75] Inventor: Sumio Nakamura, Tokyo, Japan
[73] Assignee: Olympus Optical Co., Ltd., Shibuya-ku, Tokyo-to, Japan
[22] Filed: Apr. 11, 1973
[21] Appl. No.: 349,943

[30] Foreign Application Priority Data
Apr. 14, 1972 Japan............................ 47-036903

[52] U.S. Cl.................................. 350/223, 350/176
[51] Int. Cl. .............................................. G02b 9/34
[58] Field of Search............................ 350/223, 176

[56] References Cited
UNITED STATES PATENTS
1,463,132  7/1923  Graf................................ 350/220 X
2,481,688  9/1949  Schade et al. ..................... 350/223

*Primary Examiner*—John K. Corbin
*Attorney, Agent, or Firm*—Cushman, Darby & Cushman

[57] ABSTRACT

The present invention relates to photographic lens systems and more particularly, to a large-aperture telephoto lens system. The lens system of the present invention comprises four lenses, a first lens, second lens, third lens and fourth lens and is characterized in that various aberrations are favourably corrected by moving said fourth lens when photographing an object at a short distance.

6 Claims, 45 Drawing Figures

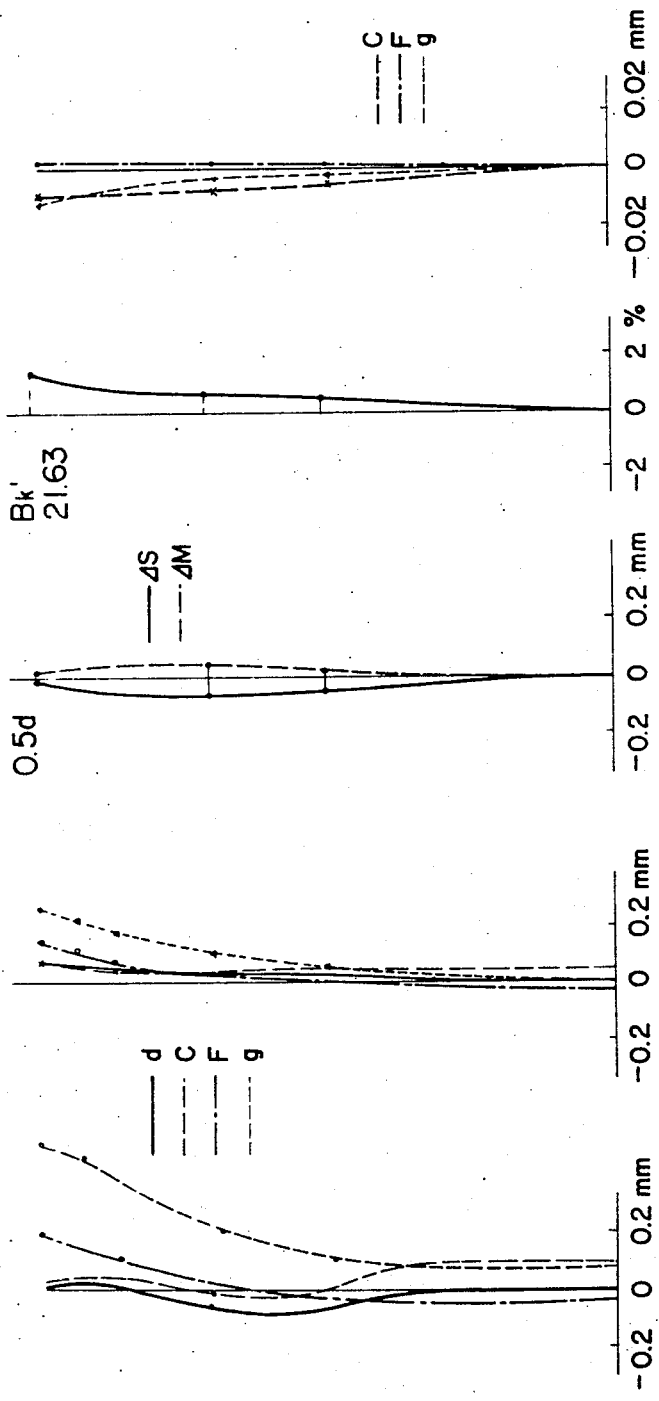

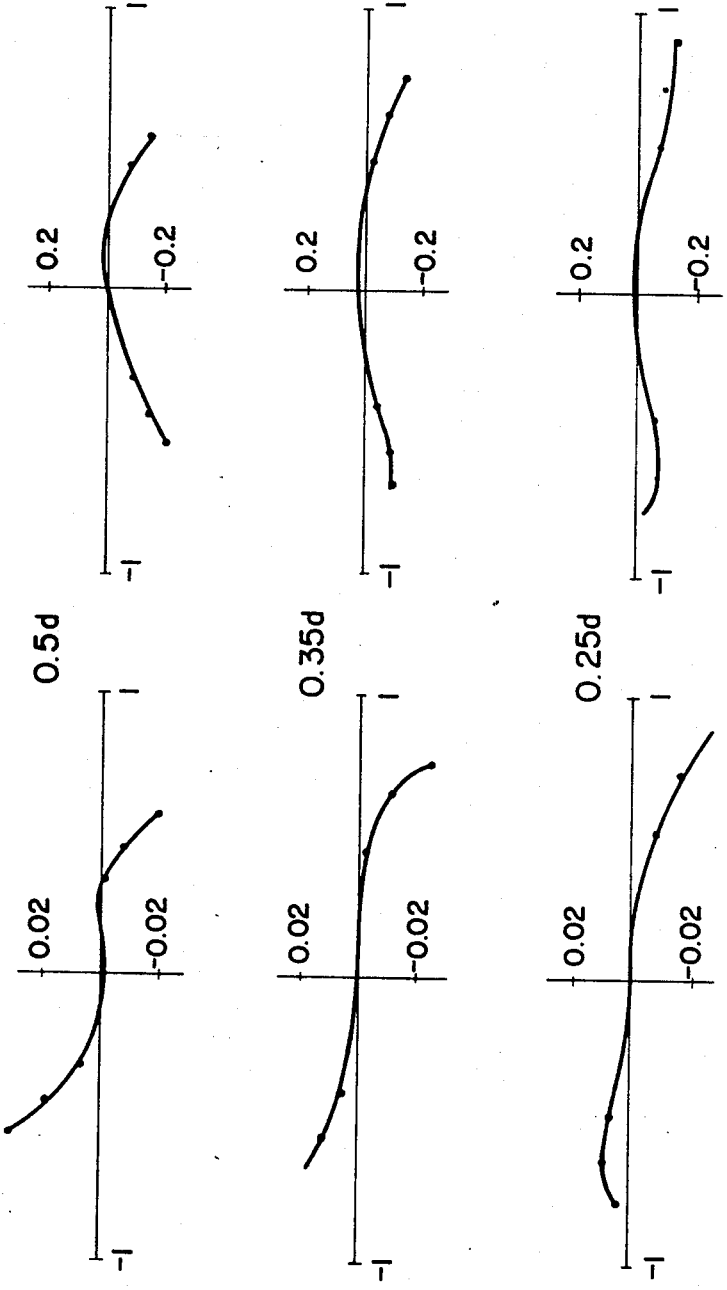

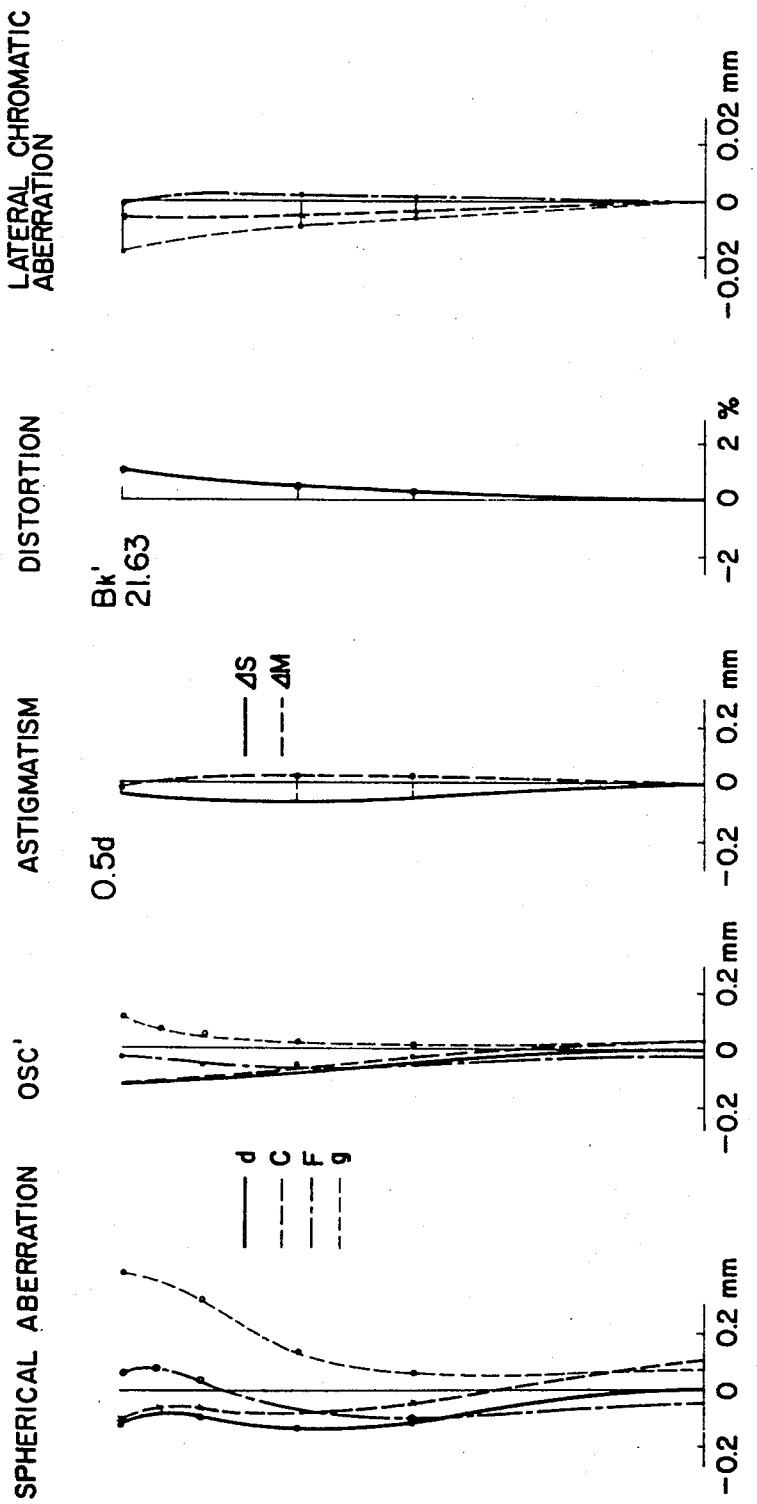

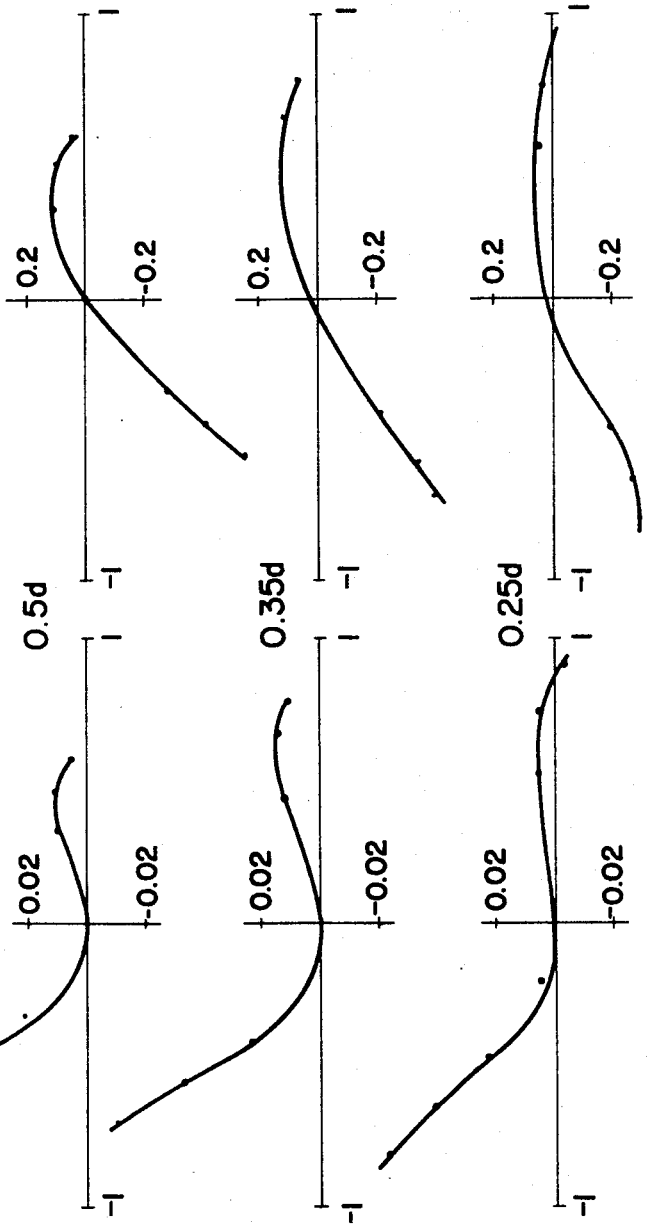

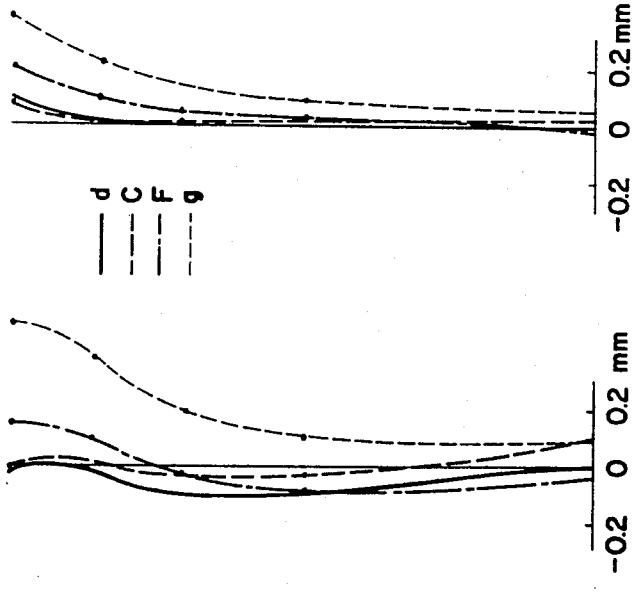

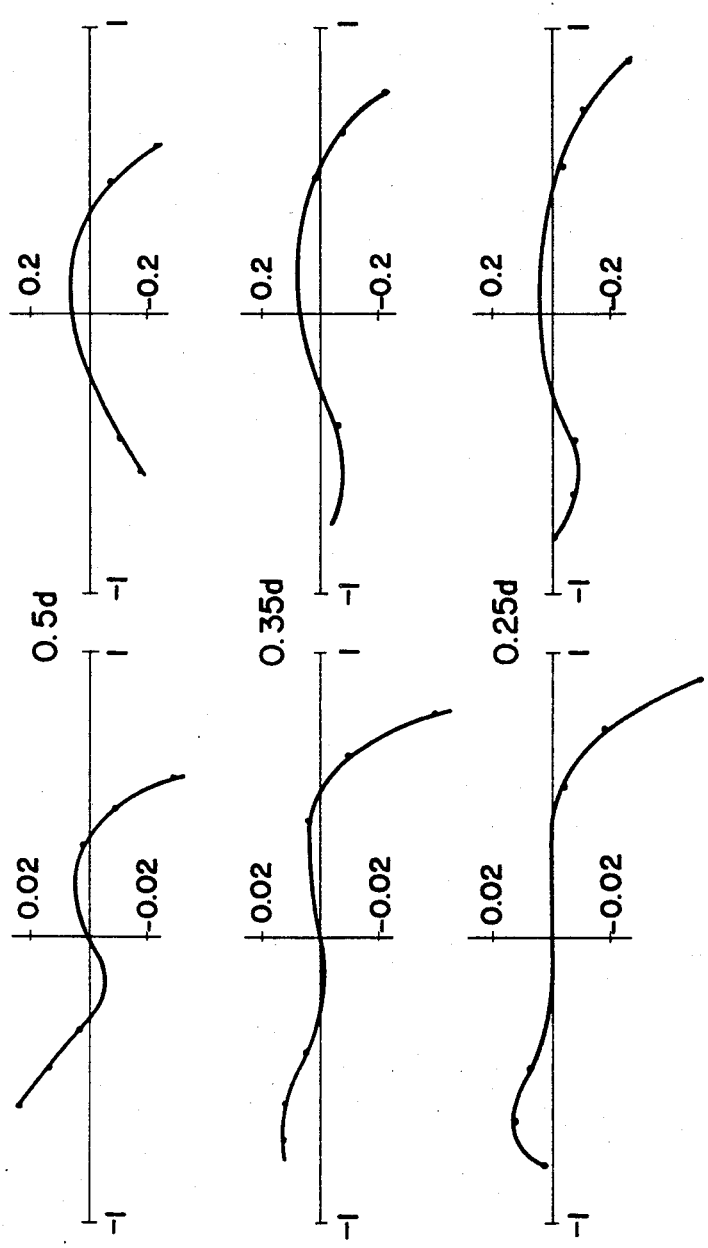

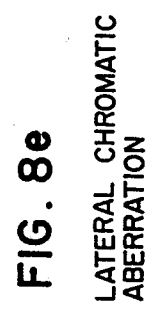

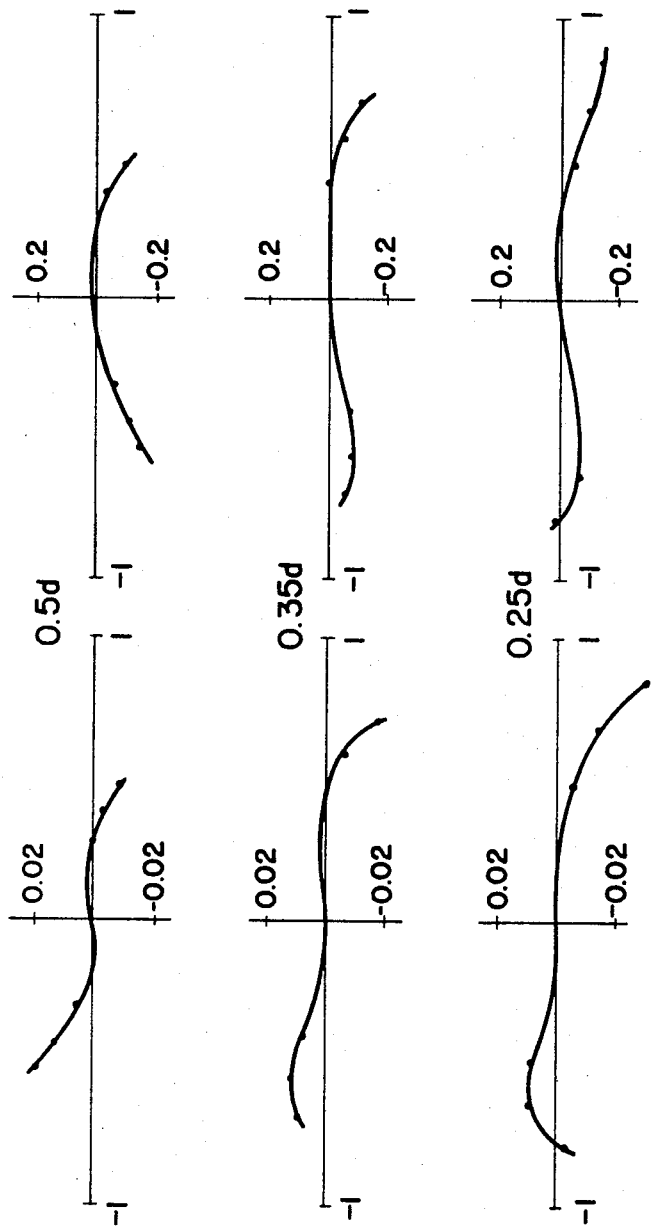

LARGE-APERTURE TELEPHOTO LENS

BACKGROUND OF THE INVENTION a. Field of the Invention

The present invention relates to a semi-telephoto lens system having an aberration correcting mechanism.

b. Description of the Prior Art

Generally, semi-telephoto lenses with the focal length 85 mm through 105 mm and field angle 30° to 23° are handy and are convenient for both using and bringing as these lens systems have intermidiate functions between standard lenses and telephoto lenses. Therefore, semi-telephoto lenses are often used under both of different kinds of photographing conditions such as for portrait photographing and for telephotographing of objects at a long distance. That is, in portrait photographing, the lens system is used to photograph an object at a distance about 1 m to 6 m. As for the quality of the image, it is required that coma is caused symmetrically and flare occurs to some extent still resolution is good, i.e., soft photographing effect is desired when the stop is fully opened.

On the other hand, in telephotographing, the distance from the object is several meters to infinit and high resolution is required for high contrast unlike the case where the lens is used for portrait photographing. Besides, it is required to make the lens system compact by minimizing the telephoto ratio (distance from the first surface of the lens system to the back focus ÷ total focal length) so that the lens system can be suitably housed in the camera case for the standard lens when mounted to the camera.

For the lens system of the present invention, an automatic correcting mechanism to float a predetermined lens is adapted as a means for correcting aberrations which become unfavourable when photographing with higher magnifications as in case of close-up photographing. By this method, deterioration of coma and off axial spherical aberration are restored to favourable conditions in order to improve the quality of the image at the marginal portion of the field. Besides, by using such type of lens for which the favourable effect obtained by floating the pre-determined lens is remarkable, the above-mentioned restoring effect is further promoted.

SUMMARY OF THE INVENTION

It is, therefore, a principal object of the present invention to provide a semi-telephoto lens system for which aberrations are favourably corrected when the distance from the object is infinite and, at the same time, aberrations are also favourably corrected even in close-up photographing by adopting a floating mechanism for a pre-determined lens, and with which soft photographing effect of the image can be achieved.

The semi-telephoto lens according to the present invention comprises the following four lenses. That is, the first lens is a positive meniscus lens with its convex surface positioned on the object side, the second lens is a cemented positive meniscus lens with its convex surface positioned on the object side, third lens is a negative meniscus lens with its convex surface positioned on the object side and the fourth lens is a cemented lens. Besides, the semi-telephoto lens of the present invention satisfies the conditions as listed below, when reference symbols $r_1$ through $r_{10}$, respectively, represent radii of curvatures of lens surfaces being counted in order from the object side, reference symbols $n_1$ through $n_6$ represent refractive indexes of respective lenses, reference symbols $\nu_2$ through $\nu_6$ Abbe's numbers of respective lenses, reference symbol $f$ represents the total focal length of the lens system as a whole and reference symbol $f_{123}$ represents the total focal length of the first, second and third lenses.

$$\nu_2 > \nu_3 > 45 \ , \ n_3 > n_2, \ 0.3f > |r_4| > 0.15f \quad (1)$$

$$\nu_6 > \nu_5 > 45 \ , \ n_5 > n_6 \ , \ 0.3f > |r_9| > 0.15f \quad (2)$$

$$30 > \nu_4 \ , \ n_4 > 1.70 \quad (3)$$

$$f_{123} \gtreqless 2f \quad (4)$$

Besides the above-mentioned arrangement, the semi-telephoto lens of the present invention is arranged as follows in order to satisfy both of different requirements in telephotographing and portrait photographing. That is, aberrations are corrected on the basis of photographing an object at the infinite distance as in case of designing ordinary lenses. Besides, in order to favourably correct aberrations when photographing with higher magnifications, a means is provided to float a pre-determined lens, i.e., the fourth lens, by mechanically connecting the fourth lens to the advancing mechanism of the lens system as a whole at the time of photographing with a higher magnification.

For the semi-telephoto lens system of the present invention, the fourth lens is floated as mentioned above in order to improve the quality of the image at marginal portions by offaxial rays. Conditions (1) and (2) are required mainly to correct aberrations caused by offaxial rays in cooperation with the above-mentioned floating of the fourth lens. Conditions (1) and (2) also serve to make the astigmatism and coma stable in order to achieve high resolving power for the whole field.

In conditions (1) and (2), conditions concerning Abbe's numbers and refractive indexes are effective for correction of paraxial and offaxial chromatic aberrations and, at the same time, they are also effective to prevent deterioration of distortion which occurs as the telephoto ratio is made small in order to make the lens system compact.

If these conditions are not satisfied and relation of Abbe's numbers become $\nu_2 < \nu_3$ , $\nu_5 < \nu_3$ , paraxial and offaxial chromatic aberrations can not be fully corrected even when conditions concerning refractive indexes in conditions (1) and (2) are satisfied and, moreover, lateral chromatic aberration cannot be limited small.

When Abbe's number of either the second or fourth lenses is smaller than 45, it becomes impossible to make positive dispersion satisfactorily small and correction becomes impossible even when the other conditions are satisfied. Conditions concerning refractive indexes of the second and fourth lenses are effective to reduce Petzval's sum, which tends to become large at the second and fourth lenses, and consequently serves for easier correction of astigmatism.

If conditions of refractive indexes are not satisfied and the relation of refractive indexes become $n_3 < n_2$ , $n_5 < n_6$, lateral chromatic aberration and paraxial chromatic aberration cannot be favourably corrected even when the other conditions are satisfied and, especially, over-correction occurs for the g-line.

Conditions regarding radii of curvatures $r_4$ and $r_9$ for the cemented surfaces of the second and fourth lenses are necessary for restoring coma and offaxial spherical aberration which may become unfavourable when the fourth lens is floated for the purpose of improving the quality of the image at the marginal portion of the field.

That is, when values of these radii of curvatures are within the range of the afore-mentioned conditions, the spherical aberration curve re-curves, thus spherical aberration is favourably corrected. Besides, these conditions concerning radii of curvatures also contribute to ensure symmetry of astigmatism and, consequently it becomes possible to achieve stable resolving power over the whole field.

If $r_4$ or $r_9$ is larger than the upper limit or smaller than the lower limit of the above conditions, coma increases and its correction becomes impossible. Besides, when the relation is $r_4 > 0.3f$, $r_9 > 0.3f$, the lens system cannot be made compact if it is intended to eliminate the influence of change of magnification on aberrations of offaxial rays by selecting the centers of curvatures of both cemented surfaces ($r_4$, $r_9$) at an approximately the same position so that surfaces $r_4$ and $r_9$ are approximately in the same spherical surface. If the relation is $r_9 < 0.15f$, it becomes difficult to favourably correct spherical aberration for every wavelength when the fourth lens is floated.

In the lens system of the present invention, only the third lens is a negative lens. Therefore, to minimize Petzval's sum of the lens system as a whole and to make the dispersion small, it is necessary to select Abbe's number and refractive index as given in the condition (3). If the condition (3) is not satisfied, it is impossible to make Petzval's sum, which tends to become large at the second and fourth lenses, for the lens system as a whole small and, moreover, distortion cannot be made small.

Besides, in the semi-telephoto lens system of the present invention, the refractive index and Abbe's number for the cemented second and fourth lenses are in reverse combination to those for ordinary cemented lenses and, therefore, no lenses other than the third lens has negative dispersion. Consequently, dispersion for the lens sytem as a whole cannot be made small unless negative dispersion at the third lens is made very large.

The condition (4) is established to achieve effective correcting results by floating of the lens. That is, by arranging the lens group on the front side of the fourth lens as an afocal lens group or a positive lens group having an extremely small positive power, marginal rays coming from the first, second and third lenses are made as far as possible close to parallel rays in relation to the axis, between the third and fourth lenses. Thus, unfavourable influence to spherical aberration which may be caused by floating the fourth lens is minimized. If the condition (4) is not satisfied, it becomes difficult to correct spherical aberration when the fourth lens is floated and, moreover, it becomes impossible to restore coma and offaxial spherical aberration.

In the following, the above-mentioned semi-telephoto lens system of the present invention is described according to the illustrated embodiments.

BRIEF DESCRIPTION OF THE DRAWINGS

FIG. 2a through FIG. 2g illustrate curves showing aberration characteristics for rays from infinity for the embodiment 1 of the present invention;

FIG. 4a through FIG. 4g show graphs illustrating aberration characteristics of the embodiment 1 at close-up photographing when the fourth lens is not moved;

FIG. 6a through FIG. 6g show graphs illustrating aberration characteristics of the embodiment 1 at close-up photographing when the fourth lens is moved;

FIG. 8a through FIG. 8g show graphs illustrating aberration characteristics of the embodiment 2 of the semi-telephoto lens system according to the present invention.

DETAILED DESCRIPTION OF THE PREFERRED EMBODIMENTS

Figure 1:
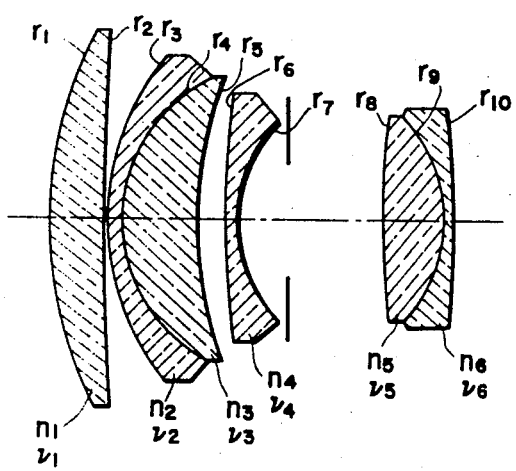
FIG. 1 shows a sectional view illustrating the composition of the embodiments of the semi-telephoto lens system according to the present invention.

As shown in FIG. 1, the semi-telephoto lens system according to the present invention comprises four lenses, i.e., the first lens is a positive meniscus lens, second lens is a cemented positive meniscus lens, third lens is a negative meniscus lens, fourth lens is a cemented positive lens, and a stop is provided between the third and fourth lenses. Numerical data of embodiments of the present invention are as given below.

Embodiment 1

| | | | | | | | |
|---|---|---|---|---|---|---|---|
| $r_1 =$ | 47.415 | | | | | | |
| | | $d_1 =$ | 6.24 | $n_1 =$ | 1.651 | $\nu_1 =$ | 56.15 |
| $r_2 =$ | 382.376 | | | | | | |
| | | $d_2 =$ | 0.15 | | | | |
| $r_3 =$ | 29.457 | | | | | | |
| | | $d_3 =$ | 1.80 | $n_2 =$ | 1.60311 | $\nu_2 =$ | 60.70 |
| $r_4 =$ | 19.612 | | | | | | |
| | | $d_4 =$ | 8.87 | $n_3 =$ | 1.691 | $\nu_3 =$ | 54.84 |
| $r_5 =$ | 53.405 | | | | | | |
| | | $d_5 =$ | 3.60 | | | | |
| $r_6 =$ | 119.915 | | | | | | |
| | | $d_6 =$ | 1.40 | $n_4 =$ | 1.80518 | $\nu_4 =$ | 25.43 |
| $r_7 =$ | 18.538 | | | | | | |
| | | $d_7 =$ | 17.50 | | | | |
| $r_8 =$ | 125.044 | | | | | | |
| | | $d_8 =$ | 7.60 | $n_5 =$ | 1.697 | $\nu_5 =$ | 48.51 |
| $r_9 =$ | −17.176 | | | | | | |
| | | $d_9 =$ | 0.90 | $n_6 =$ | 1.62299 | $\nu_6 =$ | 58.14 |
| $r_{10} =$ | −122.866 | | | | | | |

$f = 84.992$
$f_{123} = 244.406$

Embodiment 2

| | | | | | | | |
|---|---|---|---|---|---|---|---|
| $r_1 =$ | 44.137 | | | | | | |
| | | $d_1 =$ | 6.28 | $n_1 =$ | 1.651 | $\nu_1 =$ | 56.15 |
| $r_2 =$ | 281.551 | | | | | | |
| | | $d_2 =$ | 0.15 | | | | |
| $r_3 =$ | 30.563 | | | | | | |
| | | $d_3 =$ | 1.80 | $n_2 =$ | 1.61272 | $\nu_2 =$ | 58.75 |
| $r_4 =$ | 19.458 | | | | | | |
| | | $d_4 =$ | 8.87 | $n_3 =$ | 1.6968 | $\nu_3 =$ | 56.51 |
| $r_5 =$ | 53.203 | | | | | | |
| | | $d_5 =$ | 3.60 | | | | |
| $r_6 =$ | 128.926 | | | | | | |
| | | $d_6 =$ | 1.40 | $n_4 =$ | 1.7847 | $\nu_4 =$ | 26.22 |
| $r_7 =$ | 18.636 | | | | | | |
| | | $d_7 =$ | 17.78 | | | | |
| $r_8 =$ | 103.353 | | | | | | |
| | | $d_8 =$ | 7.60 | $n_5 =$ | 1.6779 | $\nu_5 =$ | 50.72 |
| $r_9 =$ | −16.802 | | | | | | |
| | | $d_9 =$ | 0.90 | $n_6 =$ | 1.62041 | $\nu_6 =$ | 60.27 |
| $r_{10} =$ | −129.614 | | | | | | |

$f = 85.016$
$f_{123} = 235.233$

In the above numerical data, reference symbols $r_1$ through $r_{10}$ represent radii of curvatures of respective surfaces of lenses, reference symbols $d_1$ through $d_9$ represent thicknesses of respective lenses and spaces between lenses, reference symbols $n_1$ through $n_6$ represent refractive indexes of respective lenses, reference symbols $\nu_1$ through $\nu_6$ represent Abbe's numbers of respective lenses, reference symbol $f$ represents the total focal length of the lens system as a whole, and reference symbol $f_{123}$ represents the total focal length of the first, second and third lenses.

Figure 3A:
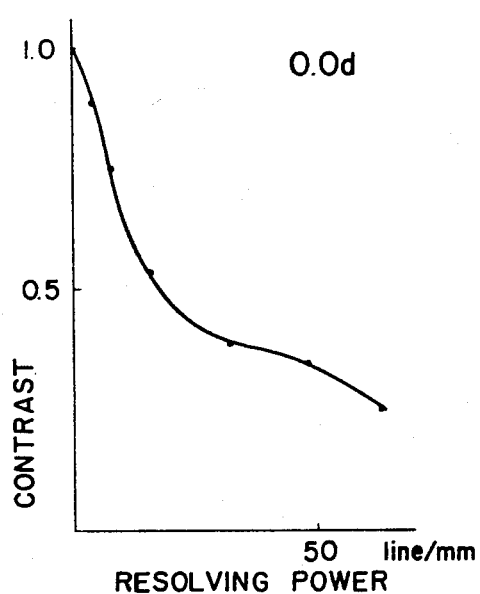
FIG. 3a through FIG. 3d show graphs illustrating relations between the resolving power and contrast of the embodiment 1.
Figure 3B:
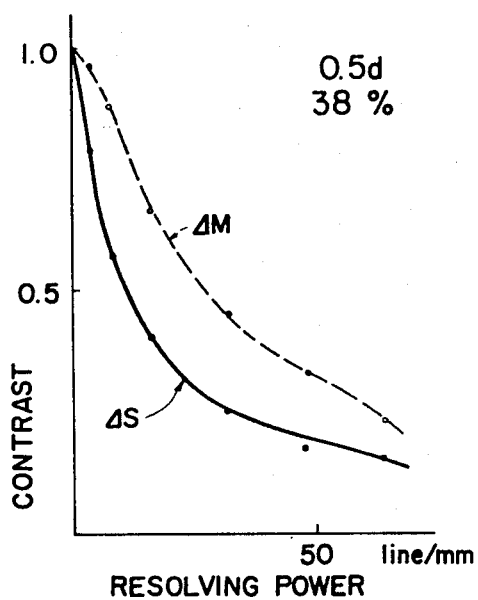
Figure 3C:
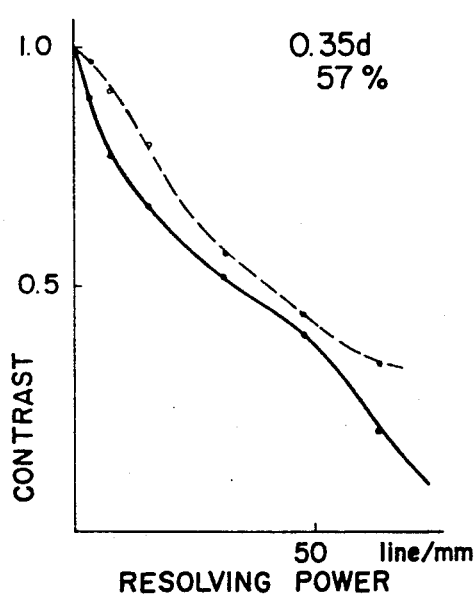
Figure 3D:
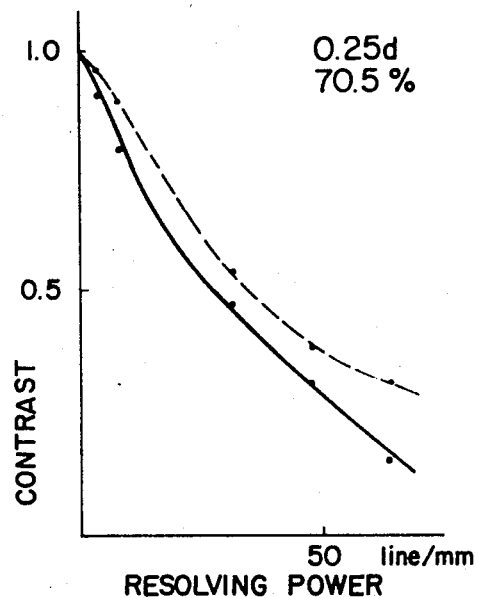
Figure 5A:
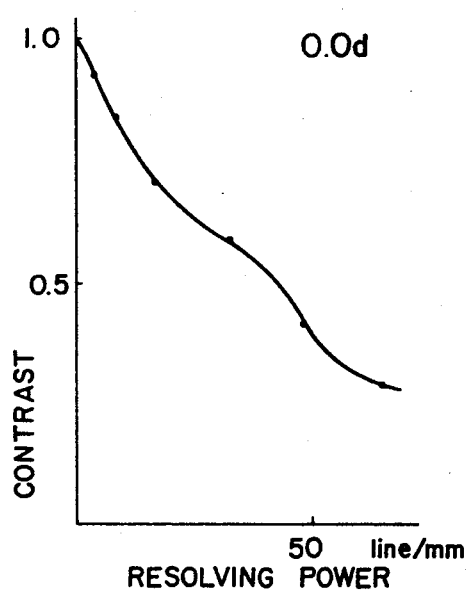
FIG. 5a through FIG. 5d show graphs illustrating relations between the resolving power and contrast for the embodiment 1 at close-up photographing when the fourth lens is not moved.
Figure 5B:
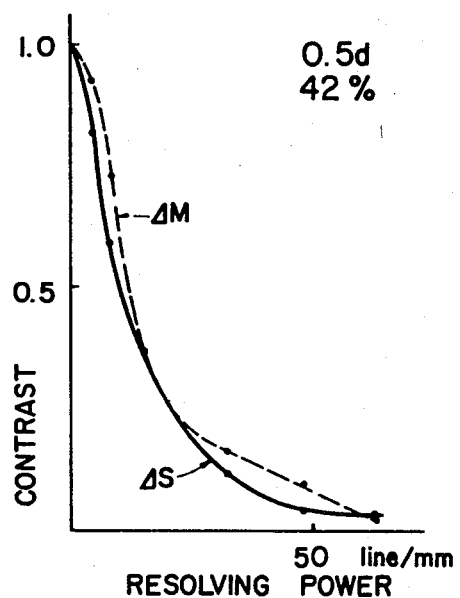
Figure 5C:
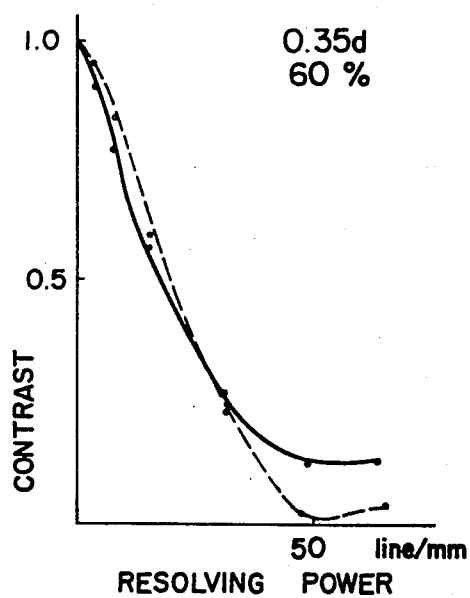
Figure 5D:
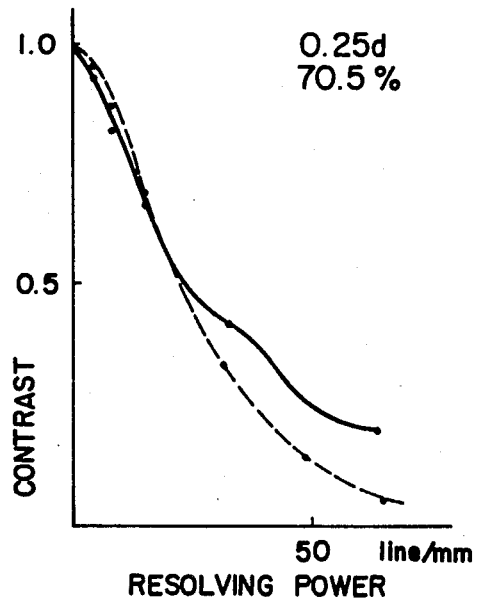
Figure 7A:
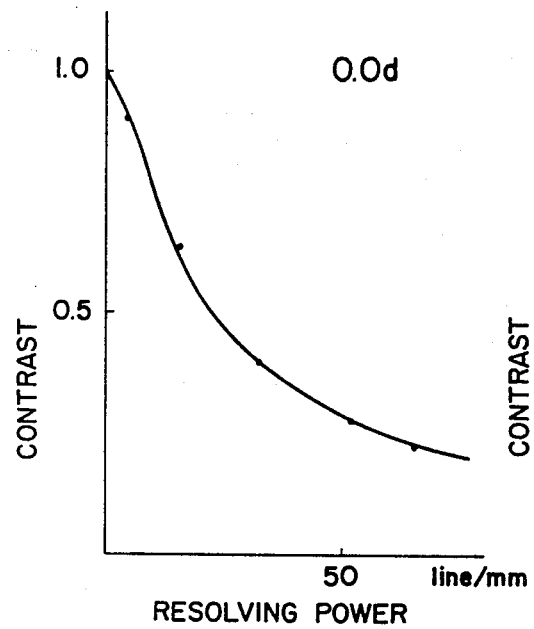
FIG. 7a through FIG. 7d show graphs illustrating relations between the resolving power and contract for the embodiment 1 at close-up photographing when the fourth lens is moved.
Figure 7B:
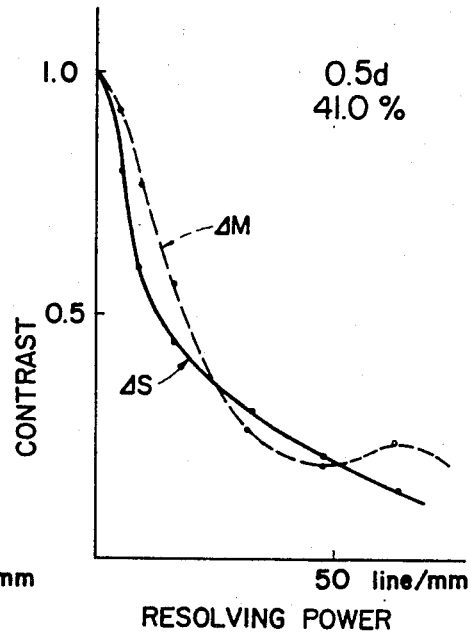
Figure 7C:
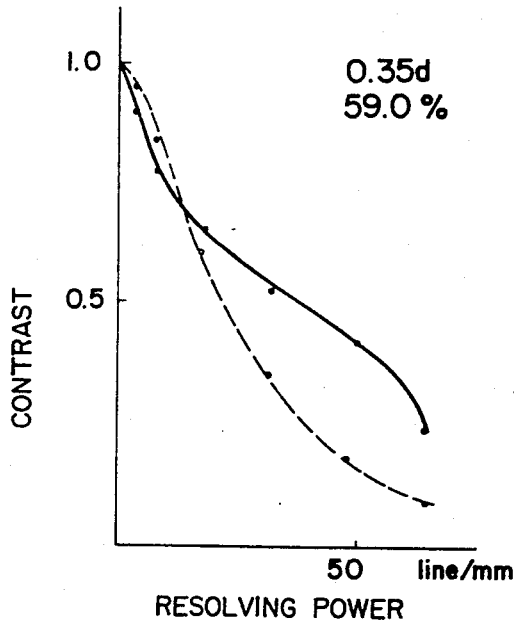
Figure 7D:
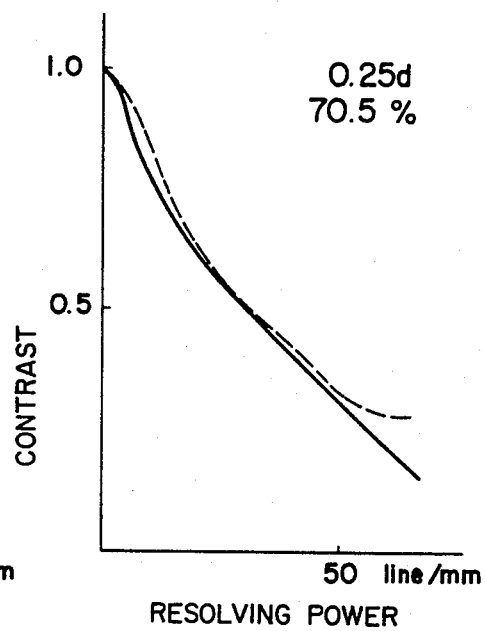
Figure 9A:
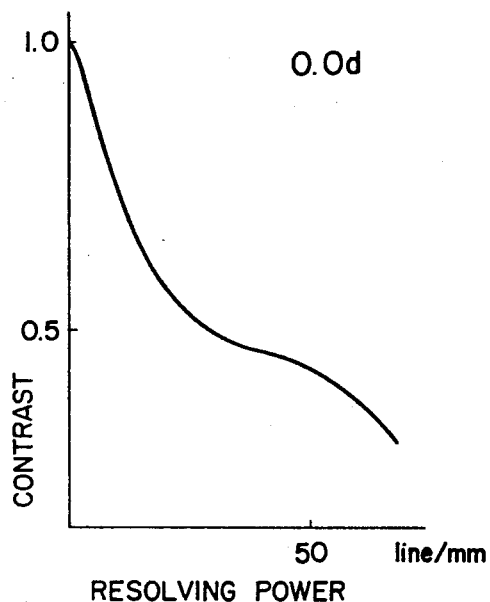
FIG. 9a through FIG. 9d show graphs illustrating relations between the resolving power and contrast of the embodiment 2 of the present invention.
Figure 9B:
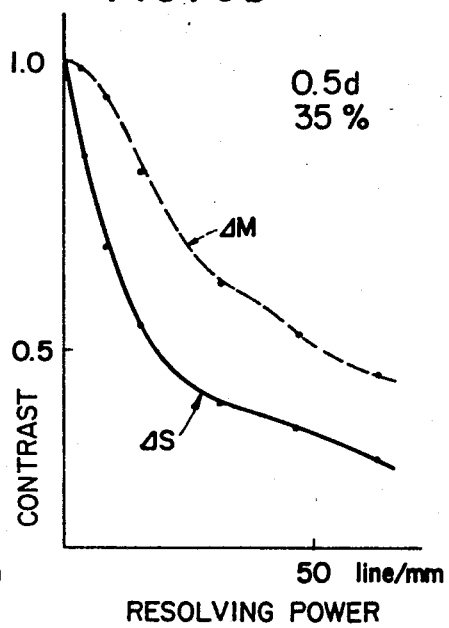
Figure 9C:
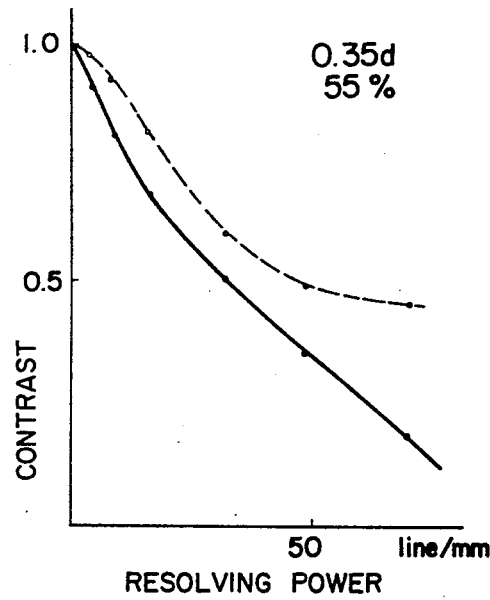
Figure 9D:
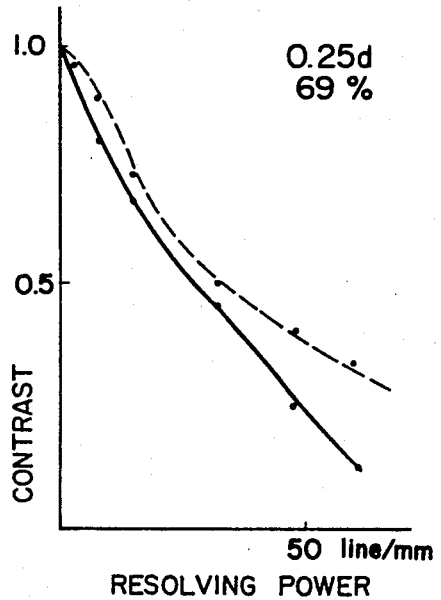

For the embodiment 1, aberration characteristics for rays from infinity are shown in FIG. 2a through FIG. 2g. FIG. 2a shows the spherical aberration, FIG. 2b shows OSC', FIG. 2c shows the astigmatism, FIG. 2d shows distortion, FIG. 2e shows the lateral chromatic aberration, FIG. 2f shows coma and FIG. 2g shows offaxial spherical aberration. The relation between the resolving power and contrast of the embodiment 1 is shown in FIG. 3a through FIG. 3d. FIG. 3a shows the resolving power for paraxial rays (0.0d, reference symbol d represents the lens diameter). FIG. 3b shows the resolving power for marginal rays (0.5d). FIG. 3c and FIG. 3d respectively show resolving powers for zonal rays (0.35d, 0.25d).

FIG. 4a through FIG. 4g show aberration characteristics of the embodiment 1 when the magnification is 0.05 without floating the fourth lens and FIG. 5a through FIG. 5d show relations between the resolving power and contrast of the embodiment 1 under the same conditions as those for FIG. 4a through FIG. 4g in said case.

Besides, when the magnification is 0.05 by floating the fourth lens of the embodiment 1, it becomes $d_7 = 18.2$ and $f = 85.297$. FIG. 6a through FIG. 6g show aberration characteristics in said case and FIG. 7a through FIG. 7d show relations between the resolving power and contrast in said case.

For the embodiment 2 of the present invention, FIG. 8a through FIG. 8g show aberration characteristics and FIG. 9a through FIG. 9d show relations between the resolving power and contract.

From the above-mentioned graphs of aberration characteristics curves of the embodiments 1 and 2, it is evident that various aberrations are quite favourably corrected and the resolving power is very high. Besides, as for the resolving power at the marginal portion of the field, the resolving power decreases at higher contrasts showing a steep curve and that at lower contrasts are very high. At the same time, symmetry of coma is also very favourable. Thus, it is evident that the semi-telephoto lens system of the present invention is capable of assuring the soft photographing effect when the stop is fully opened. Besides, when a comparison is made for the embodiment 1 between the cases where the predetermined lens is moved and not moved when photographing with higher magnification, i.e., in close-up photographing, conspicuously superior results are obtained regarding both symmetry of the coma and resolving power when said lens is moved. Thus, it is evident that the requirements in close-up photographing can be satisfied much better by moving said lens is close-up photographing. Thus, the present invention provides a compact semi-telephoto lens system which is suitable for both telephotographing and close-up photographing.

I claim:

1. A large-aperture telephoto lens system comprising a first lens, a second lens, a third and a fourth lens, wherein said first lens is a positive meniscus lens with its convex surface positioned on the object side, said second lens is a cemented positive meniscus doublet lens with its convex surface positioned on the object side, said third lens is a negative meniscus lens with its convex surface positioned on the object side and said fourth lens is a cemented positive doublet lens, and said large-aperture telephoto lens system satisfying the following conditions:

$$\nu_2 > \nu_3 > 45, \; n_3 > n_2, \; 0.3f > |r_4| > 0.15f \quad (1)$$

$$\nu_6 > \nu_5 > 45, \; n_5 > n_6, \; 0.3f > |r_9| > 0.15f \quad (2)$$

$$30 > \nu_4, \; n_4 > 1.70 \quad (3)$$

$$f_{123} \geqq 2f \quad (4)$$

where reference symbols $n_2$, $n_3$, $n_5$, $n_6$ and $n_4$, respectively represent refractive indexes of the front and rear lenses of the cemented second and fourth lenses and refractive index of the third lens, reference symbols $\nu_2$, $\nu_3$, $\nu_4$, $\nu_5$, and $\nu_6$, respectively, represent Abbe's numbers of said lenses, reference symbols $r_4$ and $r_9$, respectively, represent radii of curvatures of cemented surfaces of said second and fourth lenses, reference symbol $f_{123}$ represents the total focal length of said first, second and third lenses and reference symbol $f$ represents the total focal length of the lens system as a whole.

2. A large-aperture telephoto lens system according to claim 1 wherein said fourth lens is arranged to be moved in close-up photographing at the same time as advancing said lens system as a whole.

3. A large-aperture telephoto lens system comprising a first lens, a second lens, a third and a fourth lens, wherein said first lens is a positive meniscus lens with its convex surface positioned on the object side, said second lens is a cemented positive meniscus doublet lens with its convex surface positioned on the object side, said third lens is a negative meniscus lens with its convex surface positioned on the object side and said fourth lens is a cemented positive doublet lens, and said large-aperture telephoto lens system having numerical data as given below:

4. A large-aperture telephoto lens system according to claim 3 wherein said fourth lens is arranged to be moved in close-up photographing at the same time as advancing said lens system as a whole.

5. A large-aperture telephoto lens system comprising a first lens, a second lens, a third and a fourth lens, wherein said first lens is a positive meniscus lens with its convex surface positioned on the object side, said second lens is a cemented positive meniscus doublet lens with its convex surface positioned on the object side, said third lens is a negative meniscus lens with its convex surface positioned on the object side and said fourth lens is a cemented positive doublet lens, and said large-aperture telephoto lens system having numerical data as given below:

| | | | | | | | |
|---|---|---|---|---|---|---|---|
| $r_1 =$ | 47.415 | | | | | | |
| | | $d_1 =$ | 6.24 | $n_1 =$ | 1.651 | $\nu_1 =$ | 56.15 |
| $r_2 =$ | 382.376 | | | | | | |
| | | $d_2 =$ | 0.15 | | | | |
| $r_3 =$ | 29.457 | | | | | | |
| | | $d_3 =$ | 1.80 | $n_2 =$ | 1.60311 | $\nu_2 =$ | 60.70 |
| $r_4 =$ | 19.612 | | | | | | |
| | | $d_4 =$ | 8.87 | $n_3 =$ | 1.691 | $\nu_3 =$ | 54.84 |
| $r_5 =$ | 53.405 | | | | | | |
| | | $d_5 =$ | 3.60 | | | | |
| $r_6 =$ | 119.915 | | | | | | |
| | | $d_6 =$ | 1.40 | $n_4 =$ | 1.80518 | $\nu_4 =$ | 25.43 |
| $r_7 =$ | 18.538 | | | | | | |
| | | $d_7 =$ | 17.50 | | | | |
| $r_8 =$ | 125.044 | | | | | | |
| | | $d_8 =$ | 7.60 | $n_5 =$ | 1.697 | $\nu_5 =$ | 48.51 |
| $r_9 =$ | −17.176 | | | | | | |
| | | $d_9 =$ | 0.90 | $n_6 =$ | 1.62299 | $\nu_6 =$ | 58.14 |
| $r_{10} =$ | −122.866 | | | | | | |

$f = 84.992$
$f_{123} = 244.406$

| | | | | | | | |
|---|---|---|---|---|---|---|---|
| $r_1 =$ | 44.137 | | | | | | |
| | | $d_1 =$ | 6.28 | $n_1 =$ | 1.651 | $\nu_1 =$ | 56.15 |
| $r_2 =$ | 281.551 | | | | | | |
| | | $d_2 =$ | 0.15 | | | | |
| $r_3 =$ | 30.563 | | | | | | |
| | | $d_3 =$ | 1.80 | $n_2 =$ | 1.61272 | $\nu_2 =$ | 58.75 |
| $r_4 =$ | 19.458 | | | | | | |
| | | $d_4 =$ | 8.87 | $n_3 =$ | 1.6968 | $\nu_3 =$ | 56.51 |
| $r_5 =$ | 53.203 | | | | | | |
| | | $d_5 =$ | 3.60 | | | | |
| $r_6 =$ | 128.926 | | | | | | |
| | | $d_6 =$ | 1.40 | $n_4 =$ | 1.7847 | $\nu_4 =$ | 26.22 |
| $r_7 =$ | 18.636 | | | | | | |
| | | $d_7 =$ | 17.78 | | | | |
| $r_8 =$ | 103.353 | | | | | | |
| | | $d_8 =$ | 7.60 | $n_5 =$ | 1.6779 | $\nu_5 =$ | 50.72 |
| $r_9 =$ | −16.802 | | | | | | |
| | | $d_9 =$ | 0.90 | $n_6 =$ | 1.62041 | $\nu_6 =$ | 60.27 |
| $r_{10} =$ | −129.614 | | | | | | |

$f = 85.016$
$f_{123} = 235.233$ where reference symbols $r_1$ through $r_{10}$ represent radii of curvatures of respective surfaces of lenses, reference symbols $d_1$ through $d_9$ represent thicknesses of respective lenses and spaces between lenses, reference symbols $n_1$ through $n_6$ represent refractive indexes of respective lenses, reference symbols $\nu_1$ through $\nu_6$ represent Abbe's numbers of respective lenses, reference symbol $f$ represents the total focal length of the lens system as a whole, and reference symbol $f_{123}$ represents the total focal length of the first, second and third lenses.

where reference symbols $r_1$ through $r_{10}$ represent radii of curvatures of respective surfaces of lenses, reference symbols $d_1$ through $d_9$ represent thicknesses of respective lenses and spaces between lenses, reference symbols $n_1$ through $n_6$ represent refractive indexes of respective lenses, reference symbols $\nu_1$ through $\nu_6$ represent Abbe's numbers of respective lenses, reference symbol $f$ represents the total focal length of the lens system as a whole, and reference symbol $f_{123}$ represents the total focal length of the first, second and third lenses.

6. A large-aperture telephoto lens system according to claim 5 wherein said fourth lens is arranged to be moved in close-up photographing at the same time as advancing said lens system as a whole.

* * * * *